United States Patent
Pateromichelakis et al.

(10) Patent No.: US 12,356,321 B2
(45) Date of Patent: Jul. 8, 2025

(54) ENTITY AND METHOD FOR NETWORK SLICE ENABLEMENT FOR A VERTICAL APPLICATION

(71) Applicant: Huawei Technologies Co., Ltd., Shenzhen (CN)

(72) Inventors: Emmanouil Pateromichelakis, Munich (DE); Xueli An, Munich (DE); Cuili Ge, Beijing (CN); Yanmei Yang, Beijing (CN); Ishan Vaishnavi, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 306 days.

(21) Appl. No.: 17/877,541

(22) Filed: Jul. 29, 2022

(65) Prior Publication Data

US 2022/0369221 A1    Nov. 17, 2022

Related U.S. Application Data (63) Continuation of application No. PCT/EP2020/052458, filed on Jan. 31, 2020.

(51) Int. Cl.
*H04W 4/00* (2018.01)
*H04W 24/08* (2009.01)
*H04W 48/18* (2009.01)

(52) U.S. Cl.
CPC .......... *H04W 48/18* (2013.01); *H04W 24/08* (2013.01)

(58) Field of Classification Search
CPC ..... H04W 48/18; H04W 24/08; H04W 28/04; H04W 72/04; H04W 72/042;
(Continued)

(56) References Cited

U.S. PATENT DOCUMENTS

| 8,190,191 B2 | 5/2012 | Livet et al. |
| 11,050,626 B2 * | 6/2021 | Senarath ................. H04L 41/12 |

(Continued)

FOREIGN PATENT DOCUMENTS

| WO | 2018103865 A1 | 6/2018 |
| WO | 2019161925 A1 | 8/2019 |
| WO | 2020011350 A1 | 1/2020 |

OTHER PUBLICATIONS

"3rd Generation Partnership Project; Technical Specification Group Services and System Aspects; Telecommunication management; Study on management and orchestration of network slicing for next generation network (Release 15)," 3GPP TR 28.801 V1.2.0, Total 79 pages, 3rd Generation Partnership Project, Valbonne, France (May 2017).

(Continued)

*Primary Examiner* — Phuongchau Ba Nguyen
(74) *Attorney, Agent, or Firm* — Leydig, Voit & Mayer, Ltd.

(57) ABSTRACT

The present disclosure relates to network slicing, in particular, in 5G networks systems. The disclosure is concerned with network slice enablement for (vertical) applications. Thus, an entity for inter-operation between a network system and at least one application is provided. The entity provides a request to the network system, for selection and/or adjustment of a network slice instance (NSI) providing one or more services to the at least one application. The request comprises a set of requirements for the at least one application and/or the one or more services. The set of requirements comprises a required configuration or adaption of at least one NSI related parameter. The entity further receives a response to the request from the network system. The response indicates a decision of the network system regarding the selection and/or adjustment of the NSI.

19 Claims, 7 Drawing Sheets

(58) Field of Classification Search
CPC ... H04W 88/08; H04W 28/08; H04W 28/084; H04W 36/22; H04W 72/01; H04L 41/0895; H04L 41/0897; H04L 41/40; H04L 41/5012; H04L 41/5054; H04L 41/5067; H04L 41/0806; H04L 41/0813; H04L 41/145; H04L 41/5048; H04L 5/0007

See application file for complete search history.

(56) References Cited

U.S. PATENT DOCUMENTS

| | | | | |
|---|---|---|---|---|
| 11,405,931 | B2* | 8/2022 | Gupta | H04W 72/52 |
| 2017/0070892 | A1* | 3/2017 | Song | H04W 36/0005 |
| 2017/0339688 | A1* | 11/2017 | Singh | H04W 72/51 |
| 2017/0367036 | A1* | 12/2017 | Chen | H04W 48/16 |
| 2018/0139107 | A1 | 5/2018 | Senarath et al. | |
| 2018/0332485 | A1 | 11/2018 | Senarath et al. | |
| 2019/0109768 | A1 | 4/2019 | Senarath et al. | |
| 2019/0261233 | A1* | 8/2019 | Duan | H04W 36/0072 |
| 2021/0306973 | A1* | 9/2021 | Casati | H04W 60/00 |
| 2022/0200874 | A1* | 6/2022 | Fendt | H04L 41/5006 |
| 2022/0338062 | A1* | 10/2022 | Bennett | H04L 41/0895 |
| 2022/0369221 | A1* | 11/2022 | Pateromichelakis | H04L 41/0806 |
| 2022/0408293 | A1* | 12/2022 | Han | H04W 28/16 |

OTHER PUBLICATIONS

"3rd Generation Partnership Project; Technical Specification Group Services and System Aspects; Service requirements for cyber-physical control applications in vertical domains; Stage 1 (Release 16)," 3GPP TS 22.104 V16.4.0, Total 55 pages, 3rd Generation Partnership Project, Valbonne, France (Dec. 2019).

"3rd Generation Partnership Project; Technical Specification Group Services and System Aspects; Study on Architecture for Next Generation System (Release 14)," 3GPP TR 23.799 V1.1.0, Total 501 pages, 3rd Generation Partnership Project, Valbonne, France (Oct. 2016).

"3rd Generation Partnership Project; Technical Specification Group Services and System Aspects; Enhancement of 3GPP support for V2X scenarios; Stage 1 (Release 16)," 3GPP TS 22.186 V16.2.0, Total 18 pages, 3rd Generation Partnership Project, Valbonne, France (Jun. 2019).

"3rd Generation Partnership Project; Technical Specification Group Services and System Aspects; Service requirements for the 5G system; Stage 1 (Release 17)," 3GPP TS 22.261 V17.0.0, Total 83 pges, 3rd Generation Partnership Project, Valbonne, France (Sep. 2019).

"3rd Generation Partnership Project; Technical Specification Group Services and System Aspects; Mission Critical Services Common Requirements (MCCoRe); Stage 1 (Release 17)," 3GPP TS 22.280 V17.2.0, Total 97 pages, 3rd Generation Partnership Project, Valbonne, France (Dec. 2019).

"3rd Generation Partnership Project; Technical Specification Group Services and System Aspects; Study on Communication for Automation in Vertical Domains (Release 16)," 3GPP TR 22.804 V16.2.0, Total 196 pages, 3rd Generation Partnership Project, Valbonne, France (Dec. 2018).

"3rd Generation Partnership Project; Technical Specification Group Services and System Aspects; Application layer support for Vehicle-to-Everything (V2X) services; Functional architecture and information flows; (Release 16)," 3GPP TS 23.286 V16.2.0, Total 62 pages, 3rd Generation Partnership Project, Valbonne, France (Dec. 2019).

"3rd Generation Partnership Project; Technical Specification Group Services and System Aspects; Architecture enhancements for 5G System (5GS) to support network data analytics services (Release 16)," 3GPP TS 23.288 V16.2.0, Total 57 pages, 3rd Generation Partnership Project, Valbonne, France (Dec. 2019).

"3rd Generation Partnership Project; Technical Specification Group Services and System Aspects; Service Enabler Architecture Layer for Verticals (SEAL); Functional architecture and information flows; (Release 16)," 3GPP TS 23.434 V16.2.0, Total 119 pages, 3rd Generation Partnership Project, Valbonne, France (Dec. 2019).

"3rd Generation Partnership Project; Technical Specification Group Services and System Aspects; System architecture for the 5G System (5GS); Stage 2 (Release 15)," 3GPP TS 23.501 V15.8.0, Total 248 pages, 3rd Generation Partnership Project, Valbonne, France (Dec. 2019).

"3rd Generation Partnership Project; Technical Specification Group Services and System Aspects; Study on application layer support for Factories of the Future in 5G network; (Release 17)," 3GPP TR 23.745 V0.7.0, Total 27 bages, 3rd Generation Partnership Project, Valbonne, France (Jan. 2020).

"3rd Generation Partnership Project; Technical Specification Group Services and System Aspects; Study on enhancements to application layer support for V2X services; (Release 17)," 3GPP TR 23.764 V0.4.0, Total 20 pages, 3rd Generation Partnership Project, Valbonne, France (Jan. 2020).

"3rd Generation Partnership Project; Technical Specification Group Services and System Aspects; Study on Mission Critical services support over 5G System (Release 16)," 3GPP TR 23.783 V0.9.0, Total 41 pages, 3rd Generation Partnership Project, Valbonne, France (Jan. 2020).

"3rd Generation Partnership Project; Technical Specification Group Services and System Aspects; Common functional architecture to support mission critical services; Stage 2 (Release 17)," 3GPP TS 23.280 V17.0.0, Total 230 pages, 3rd Generation Partnership Project, Valbonne, France (Sep. 2019).

"3rd Generation Partnership Project; Technical Specification Group Services and System Aspects; Functional architecture and information flows to support Mission Critical Push To Talk (MCPTT); Stage 2 (Release 17)," 3GPP TS 23.379 V17.0.0, Total 250 pages (Sep. 2019).

"3rd Generation Partnership Project; Technical Specification Group Services and System Aspects; Functional architecture and information flows to support Mission Critical Video (MCVideo); Stage 2 (Release 17)," 3GPP TS 23.281 V17.0.0, Total 172 pages, 3rd Generation Partnership Project, Valbonne, France (Sep. 2019).

"3rd Generation Partnership Project; Technical Specification Group Services and System Aspects; Functional architecture and information flows to support Mission Critical Data (MCData); Stage 2 (Release 17)," 3GPP TS 23.282 V17.0.0, Total 135 pages, 3rd Generation Partnership Project, Valbonne, France (Sep. 2019).

"3rd Generation Partnership Project; Technical Specification Group Services and System Aspects; Mission Critical Communication Interworking with Land Mobile Radio Systems; Stage 2 (Release 17)," 3GPP TS 23.283 V17.0.0, Total Total 168 pages, 3rd Generation Partnership Project, Valbonne, France (Sep. 2019).

"3rd Generation Partnership Project; Technical Specification Group Services and System Aspects; Study on architecture enhancements for the Evolved Packet System (EPS) and the 5G System (5GS) to support advanced V2X services (Release 16)," 3GPP TR 23.786 V16.1.0, Total 119 pages, 3rd Generation Partnership Project, Valbonne, France (Jun. 2019).

"3rd Generation Partnership Project; Technical Specification Group Services and System Aspects; Study on application layer support for V2X services; (Release 16)," 3GPP TR 23.795 V16.1.0, Total 77 pages, 3rd Generation Partnership Project, Valbonne, France (Dec. 2018).

"3rd Generation Partnership Project; Technical Specification Group Services and System Aspects; Management and orchestration; Concepts, use cases and requirements (Release 15)," 3GPP TS 28.530 V15.3.0, Total 29 pages, 3rd Generation Partnership Project, Valbonne, France (Dec. 2019).

"3rd Generation Partnership Project; Technical Specification Group Services and System Aspects; Management and orchestration; Provisioning; (Release 15)," 3GPP TS 28.531 V15.5.0, Total 66 pages, 3rd Generation Partnership Project, Valbonne, France (Dec. 2019).

"3rd Generation Partnership Project; Technical Specification Group Services and System Aspects; Management and orchestration; Archi-

(56) References Cited

OTHER PUBLICATIONS tecture framework (Release 16)," 3GPP TS 28.533 V16.2.0, Total 29 pages 3rd Generation Partnership Project, Valbonne, France (Dec. 2019).
Held, "A Broadband Strategy for German Critical Communications," Barbara Held (BDBOS), CCEurope 2019, Federal Agency for Public Safety, Digital Radio,Total 16 pages (Mar. 12, 2019).
Huawei et al., "Proposal for solution to key issue on supporting network slicing," 3GPP TSG-SA WG6 Meeting #25, Sophia Antipolis, France, S6-181272(revision of S6-181107, 1167, 1236), Total 4 pages, 3rd Generation Partnership Project, Valbonne, France (Jul. 23-27, 2018).
BDBOS, "Pseudo-CR on 5GS network slicing supporting Mission Critical," 3GPP TSG-SA WG6 Meeting #30, Newport Beach, CA, USA, S6-190542(revision of S6-19xxxx), Total 2 pages 3rd Generation Partnership Project, Valbonne, France (Apr. 8-12, 2019).

* cited by examiner

ENTITY AND METHOD FOR NETWORK SLICE ENABLEMENT FOR A VERTICAL APPLICATION

CROSS-REFERENCE TO RELATED APPLICATIONS

This application is a continuation of International Application No. PCT/EP2020/052458, filed on Jan. 31, 2020, the disclosure of which is hereby incorporated by reference in its entirety.

TECHNICAL FIELD

The present disclosure relates to network slicing, in particular, in $5^{th}$ generation mobile or cellular communication (5G) Systems (5GS) and networks. The disclosure is specifically concerned with network slice enablement for (vertical) applications. To this end, embodiments of the disclosure provide an entity for inter-operation between a network system (e.g., 5GS) and at least one application. Further, embodiments of the disclosure provide a network entity for the network system, which supports the slice enablement, and corresponding methods.

BACKGROUND

Network slicing is a set of technologies to support network service differentiation and meet the diversified requirements from tenants, like vertical industries, as specified in $3^{rd}$ Generation Partnership Project (3GPP) TS 23.501 [x1]. A network slice (or short "slice") is a logical network that provides specific network capabilities and network characteristics.

$3^{rd}$ party interactions with respect to network slicing is partially supported in 3GPP 5GS, and mainly involves the interaction between the 5GS (e.g. a slice management system) and the $3^{rd}$ party (e.g. tenant) for the pre-commissioning, operation, and management of the network slice end-to-end, as specified in 3GPP TS 28.530 [x2].

Some vertical applications (e.g., Vehicle-to-Anything (V2X), Factories of the Future (FF)) may require dynamic adaptation of application or network requirements, which may necessitate the dynamic adaptation of end-to-end or per domain network slice configurations, so as to ensure service continuity. Real-time or dynamic modification/adaptation of network slicing may not be supported efficiently by current SA2-SA5 specifications.

Notably, as described in TS22.104, FF (also referred to as Industry 4.0) can be distinguished in application areas like: process automation, Human Machine Interfaces (HMIs) and production IT, logistics and warehousing, monitoring and maintenance. A FF application may include at least one of the following: an Industrial Internet of Things (IOT) service; a Machine Type Communication (MTC) service; an Ultra Reliable Low Latency Communication (URLLC) service; an enhanced Mobile Broadband (eMBB) service. All these are applicable to the FF use cases, which are described in TS22.104 and TS 22.261.

In this direction, 3GPP SA6 has provided some issues for further study in V2X (KI #3 in TR23.764), and in FF (KI #1 in TR 23.745), in particular, for studying the application interactions with 5GS for enabling network slicing. However no solution has been yet provided, as to how network slice awareness can be achieved in the application layer.

The vertical enabler server, as specified in SA6 (e.g., V2X application enabler (VAE) as specified in TS 23.286 for V2X or service enabler architecture layer (SEAL) server as specified in TS 23.434 for verticals) is an external application entity, which provides support functionalities (e.g. resource, Quality of Service (QoS) monitoring and control) for verticals for the interaction with one or more communication networks. However, there is no capability at the application layer to provide any slice-aware support functionality.

SUMMARY

The following procedures are specified for slice support in 5GS:
- Network slice provisioning or modification happens in Operations, Administration, Maintenance (OAM) or generally the management plane (SA5, TS 28.530/1), and this includes the configuration or adaptation of network slice and/or slice subnet parameters.
- Network Slice-to-PDU Session mapping happens in the 5G Core (5GC) or generally the control plane, by the network slice selection function (NSSF) or the access and mobility management function (AMF) (in SA2, TS 23.501).
- The OAM and the control plane interact in a service-based manner, e.g. the 5GC towards the OAM for event reporting. The OAM may adapt slice configuration based on the reported analytics/events etc.

Having analyzed in detail these procedures, embodiments of the disclosure base on the insight that an application or an external entity (e.g., a $3^{rd}$ party) does not have any control of the network slice instance (NSI) to session mapping. Notably, a user equipment (UE) is a part of the 5GS, since the radio resource control (RRC) handles the slice request. Also, the UE is not part of a service-based architecture (SBA), and cannot be slice selection service consumer.

The procedure for re-selection of an NSI requires more signaling and a new RRC connection. Accordingly, service/session continuity cannot be guaranteed.

Further, the network slice management function (NSMF) is a part of the 5GS, and is based on performance/service level agreement (SLA) monitoring and decides the adaptation of the NSI. When the NSMF decides the modification, it signals the decision to managed domains (e.g. radio access network (RAN) and core network (CN)) to apply the new policies (e.g. different coverage, radio resource management (RRM) policy).

The problem so far is that if an application (e.g., of a vertical or external entity or a $3^{rd}$ party) wants some network slice service provided by the network system, particularly regarding some slice re-selection and/or slice adjustment, this will be done indirectly (with limited awareness from the application side), and with higher signaling overhead and complexity.

In view of the above-mentioned problems and disadvantages, embodiments of the present disclosure aim to provide entities and methods that allow a direct slice (re)-selection or adjustment, as required by at least one application. Embodiments provide entities and methods, which allow the at least one application to trigger such a slice (re)-selection or adjustment to the network system (e.g., 5GS). Thereby, signaling overhead and complexity should not be increased.

Thereby, a first specific issue is that the slicing feature, for instance for V2X, may involve different interactions/exposure on demand for different applications. UEs belonging to different slices may need to coordinate using one or more networks/slices. Currently, the role of application in this is not clear, and should thus be determined. Also, out-of-coverage scenarios for some UEs should be taken into account. Further, dynamicity of network/slice adaptation is of importance, to ensure the critical Key Performance Indicators (KPIs).

Another specific issue is that, for instance, many different FF applications may belong to different slices, due to very different network requirements. An application may need different exposure based on the slice requirements. Also, different radio access technologies (RATs) or types of networks may be involved. The application may need to be able to control and/or influence slice parameters to ensure that application end-to-end (E2E) QoS requirements are met. Currently, the slice enablement at the application layer is not captured.

Considering the aforementioned issues, which are equivalent for a range of verticals, a specific problem to be solved is how to enable an entity to dynamically/flexibly translate application requirements of one or more verticals (as identified in SA1 TS 22.104, TS 22.186, TR 22.804, TS22.280, 22.261) to network slice requirements (see section 4.1.4 in TS23.580 (SA5) and TS23.501, section 5.15 (SA2)), and vice versa, so as to ensure slice and service continuity (given the different requirements from vertical scenarios).

Aspects of the disclosure are described in the enclosed embodiments and independent claims. Advantageous implementations of the embodiments of the disclosure are further defined in the dependent claims.

A first aspect of this disclosure provides an entity for inter-operation between a network system and at least one application, the entity being configured to: provide, to the network system, a request for selection and/or adjustment of a NSI providing one or more services to the at least one application, wherein the request comprises a set of requirements for the at least one application and/or the one or more services, the set of requirements comprising a required configuration or adaption of at least one NSI related parameter; and receive, from the network system, a response to the request, wherein the response indicates a decision of the network system regarding the selection and/or adjustment of the NSI.

A NSI is a set of Network Function (NF) instances and the required resources (e.g., compute, storage and/or networking resources), which form a deployed network slice.

A service (e.g., E2E service) may be offered by a service provider to one or more UEs via the underlying network (e.g. 5G network). An application is a placeholder for one or more services, and can be network-agnostic (e.g., via interactions between a server and a client, which are transparent to the network). A service is what is actually offered to the UE(s) and can be mapped to network requirements (e.g., QoS). The relation between application and service can be N:M. That means, one application may comprise more than one service, and at the same time one service may span over multiple distributed applications, which may reside in different application servers/clients. An application server may be a Vertical Application Layer (VAL) server or SEAL server. The application server may specifically be a V2X application server, or VAE application server, or FF application specific server, or FF Application Enabler (FFAE) server.

The entity of the first aspect may be referred to as a middleware application function (AF), which is configured to trigger one or both of: a NSI selection for one UE or a group of UEs; a NSI configuration for a give domain/area etc. The entity may be a 3$^{rd}$ party/vertical product, which may be different from a Public Land Mobile Network (PLMN) and the application (and application servers). The entity may provide the functionality, which allows for slice enablement for the at least one application.

Accordingly, the entity of the first aspect allows a direct slice (re)-selection or adjustment, as required by the at least one application. The application may trigger the request by the entity of the first aspect. The entity allows the at least one application to trigger such a slice (re)-selection or adjustment by the network system (e.g., 5GS). Thereby, signaling overhead and complexity is not be increased.

The entity of the first aspect may also protect the signaling and capability, which is required for the exposure between the at least one application and the network system. Another advantage may be that the entity can hide internal details of the infrastructure that are specific to the network operator. At this level the interface may be more abstracted.

In an implementation form of the first aspect, the response to the request comprises one of: a recommended NSI that satisfies the set of requirements; a recommended adaption of the set of requirements; an indication that the set of requirements cannot be satisfied.

Thus, the application can be informed about the outcome of the request, and can accordingly adapt as needed.

In an implementation form of the first aspect, the entity is further configured to: provide, to the at least one application, a notification regarding the selection and/or adjustment of the NSI, according to the response received from the network system.

In some cases, if no response is received, a timer based solution could be possible. In this case, the entity can also send notification to the application.

In an implementation form of the first aspect, the required configuration or adaption of the at least one NSI related parameter included in the set of requirements comprises at least one of: a required configuration or adaption of the mapping of the one or more NSIs; a required configuration or adaption of the one or more NSI parameters; a required configuration or adaption of one or more NSI subnet parameters for one or more User Equipments, UEs; a required configuration or adaption of the one or more network slice types.

NSI parameters can be slice SLA parameters. Further a network slice type am be a Generic Slice Template (GST) filled with values. In case of the network slice types, the Mobile Network Operator (MNO) may provide only several slice packages rather than allow the user to modify existing slice packages.

In an implementation form of the first aspect, the request comprises a request for selection of at least one NSI, and the set of requirements comprises a required convergence of one or more NSIs and/or NSI parameters for one or more UEs.

In an implementation form of the first aspect, the one or more NSI parameters comprise at least one of: a slice type; a charging requirement; a coverage area requirement; end-to-end latency requirement; an overall user density requirement; a service availability requirement; a service reliability requirement; a priority requirement; a degree of isolation requirement; an area traffic capacity requirement; a mobility requirement; a UE speed requirement; a delay tolerance; a deterministic communication; download (DL) and/or upload (UL) throughput per UE; DL and/or UL throughput per network slice; a maximum packet size; a maximum number of connections; KPI monitoring; one or more supported access technologies; user management open; one or more V2X models; term density; an activity factor; Jitter; Survival time; Reliability.

In an implementation form of the first aspect, the entity is further configured to: obtain NSI status information from the network system; and/or obtain application information related to the at least one application; wherein the entity is further configured to: provide the request for selection and/or adjustment of a NSI based on the NSI status information and/or the application information.

NSI status information, is information about the current status, e.g. current NSI parameters, of the NSI. The NSI parameters may comprise those mentioned above. Service information is information about the current status of the service, e.g., service parameters like latency etc.

In an implementation form of the first aspect, the entity is further configured to: receive a set of quality of experience (QoE) parameters for the at least one application and/or the one or more services; and/or receive, from a network data analytics function (NWDAF) QoS status information for the one or more application and/or the one or more services.

The set of QoE parameters may be derived from QoE information collected, for instance, by the application of a UE and/or OAM. Such QoE information collection (see e.g. 3GPP TS 26.247) may provide detailed information at session level on one or more specific UE(s). The QoE information may be information collected by an end user application in the UE. The QoE information may be collected by a management system for analysis and/or KPI calculations. The QoS status information may include the current QoS status information or predictive QoS status information.

A second aspect of this disclosure provides a network entity, configured to: receive, from a first entity, a request for selection and/or adjustment of an NSI providing one or more services to at least one application, wherein the request comprises a set of requirements of the at least one application and/or the one or more services, the set of requirements comprising a required configuration or adaption of at least one NSI related parameter; and provide, to the first entity, a response to the request, the response comprising one of: a recommended NSI that satisfies the set of requirements; a recommended adaption of the set of requirements; an indication that the set of requirements cannot be satisfied.

In an implementation form of the second aspect, the network entity is further configured to: adjust one or more NSIs based on the request, if a NSI can satisfy the set of requirements.

A third aspect of this disclosure provides a method for inter-operation between a network system and at least one application, the method comprising: providing, to the network system, a request for selection and/or adjustment of a NSI providing one or more services to the at least one application, wherein the request comprises a set of requirements for the at least one application and/or the one or more services, the set of requirements comprising a required configuration or adaption of at least one NSI related parameter.

In an implementation form of the third aspect, the response to the request comprises one of: a recommended NSI that satisfies the set of requirements; a recommended adaption of the set of requirements; an indication that the set of requirements cannot be satisfied.

In an implementation form of the third aspect, the method further comprises: providing, to the at least one application, a notification regarding the selection and/or adjustment of the NSI, according to the response received from the network system.

In an implementation form of the third aspect, the required configuration or adaption of the at least one NSI related parameter included in the set of requirements comprises at least one of: a required configuration or adaption of the mapping of the one or more NSIs; a required configuration or adaption of the one or more NSI parameters; a required configuration or adaption of one or more NSI subnet parameters for one or more UEs; a required configuration or adaption of the one or more network slice types.

In an implementation form of the third aspect, the request comprises a request for selection of at least one NSI, and the set of requirements comprises a required convergence of one or more NSIs and/or NSI parameters for one or more UEs.

In an implementation form of the third aspect, the one or more NSI parameters comprise at least one of: a slice type; a charging requirement; a coverage area requirement; end-to-end latency requirement; an overall user density requirement; a service availability requirement; a service reliability requirement; a priority requirement; a degree of isolation requirement; an area traffic capacity requirement; a mobility requirement; a UE speed requirement; a delay tolerance; a deterministic communication; DL and/or UL throughput per UE; DL and/or UL throughput per network slice; a maximum packet size; a maximum number of connections; KPI monitoring; one or more supported access technologies; user management open; one or more V2X models; term density; an activity factor; Jitter; Survival time; Reliability.

In an implementation form of the third aspect, the method further comprises: receiving a set of QoE parameters for the at least one application and/or the one or more services; and/or receive, from a NWDAF QoS status information for the one or more application and/or the one or more services.

The method of the third aspect achieves the same advantages as the entity of the first aspect.

A fourth aspect of this disclosure provides a method for a network entity, the method comprising: receiving, from a first entity, a request for selection and/or adjustment of an NSI providing one or more services to at least one application, wherein the request comprises a set of requirements of the at least application and/or the one or more services, the set of requirements comprising a required configuration or adaption of at least one NSI related parameter; and providing, to the first entity, a response to the request, the response comprising one of: a recommended NSI that satisfies the set of requirements; a recommended adaption of the set of requirements; an indication that the set of requirements cannot be satisfied.

In an implementation form of the fourth aspect, the method further comprises: adjusting one or more NSIs based on the request, if a NSI can satisfy the set of requirements.

The method of the fourth aspect achieves the same advantages as the network entity of the second aspect.

A fifth aspect of this disclosure provides a computer program comprising a program code for performing the method according to the third or the fourth aspect or any implementation form thereof, when executed on a computer.

A sixth aspect of this disclosure provides a non-transitory storage medium storing executable program code which, when executed by a processor, causes the method according to the third or the fourth aspect or any of their implementation forms to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Figure 1:
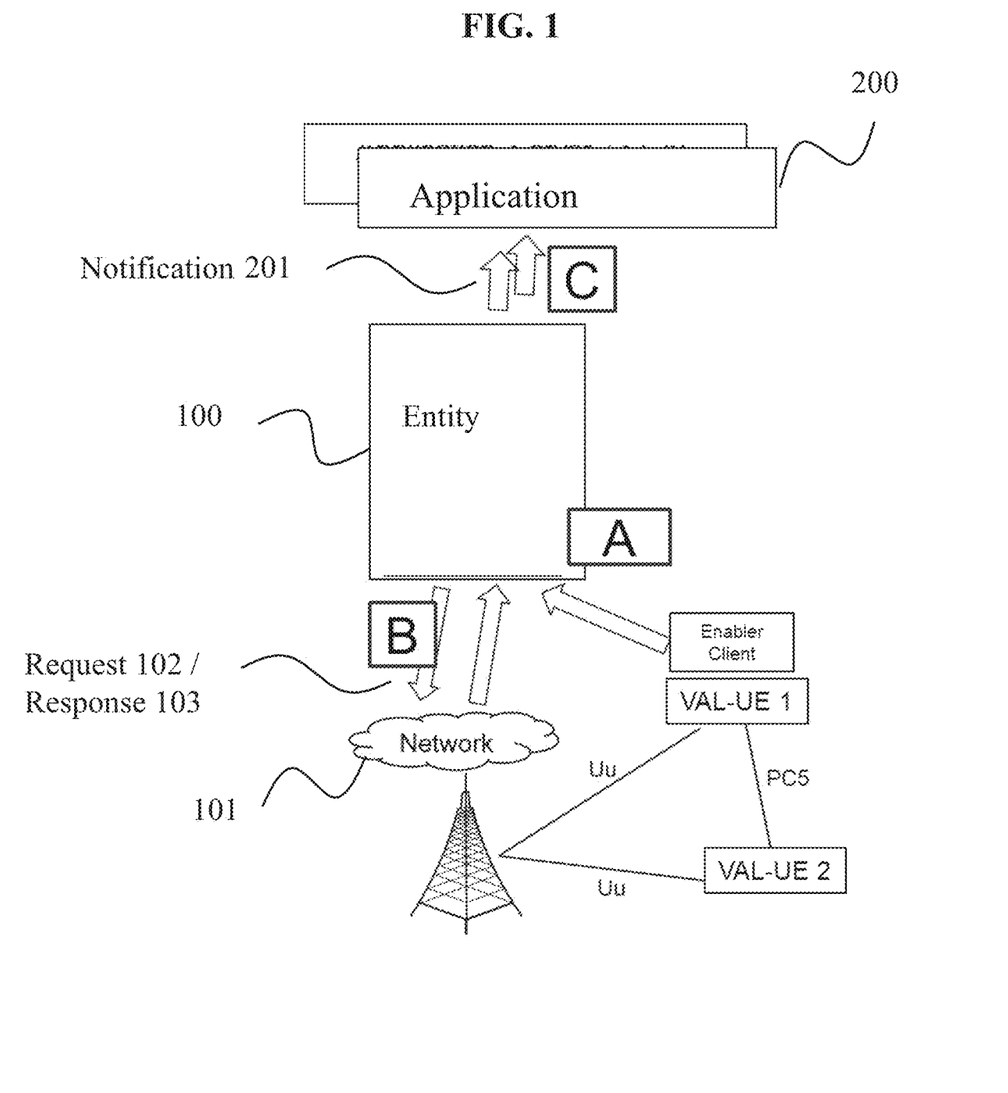
FIG. 1 shows entity and a network entity, according to embodiments of the disclosure, interacting with each other.
Figure 3:
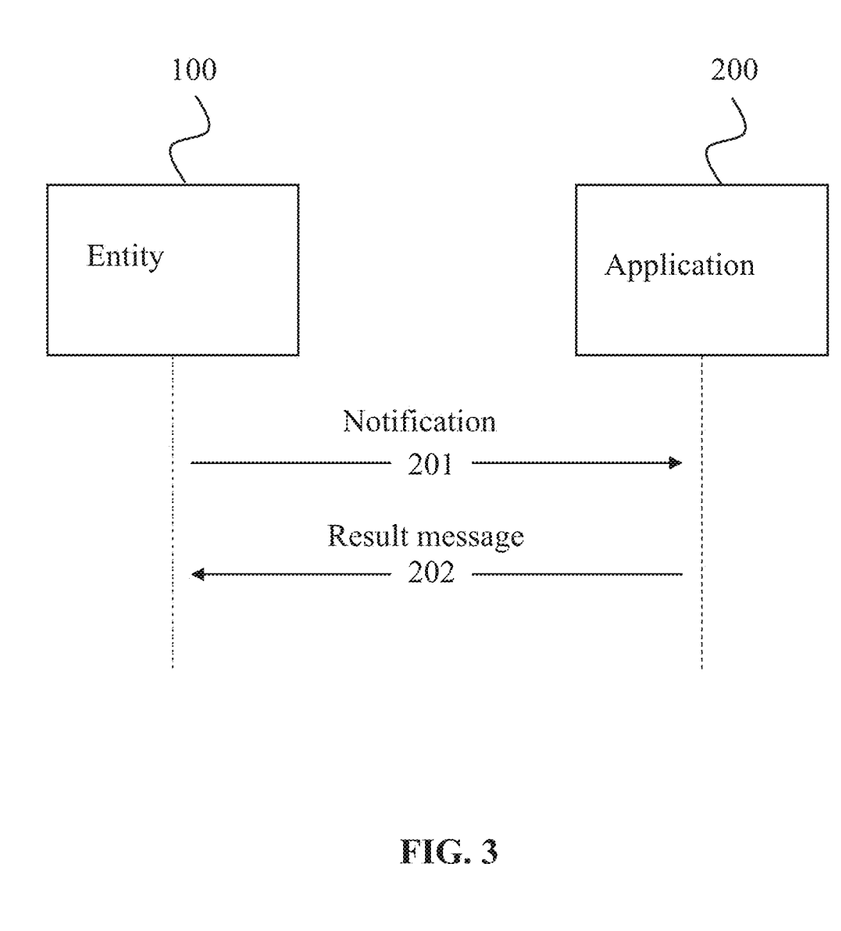
FIG. 3 shows interaction between an entity according to an embodiment of the disclosure, a network entity according to an embodiment of the disclosure, and an application.

FIG. 1 shows an overview of interaction between an entity 100 according to an embodiment of the disclosure, the network system (specifically a network entity 101 according to an embodiment of the disclosure), and an application 200 (e.g., provided by an application server). FIG. 3 shows in particular, how the entity 100 inter-operates between the network system (specifically the network entity 101) and the application.

The inter-operation/communication allows a dynamic configuration and adaptation trigger of slice parameters based on the network system and/or application requirements. This may include:
A. Translation of slice parameters to an action at the application layer, based e.g. on exposed network and/or slice monitoring by the 5GC and/or the UE, as well as application-related parameters as received by Vertical/SEAL servers. This will be at least one of the following:
Triggering of network slice instance adaptation (adaptation of NSI parameters, e.g. resources, CP/UP functions, coverage).
Triggering of network slice re-selection for one or more UEs.
Triggering of a service operation change (e.g. change of automation, grouping, etc.) for one or more UEs.
B. Notify/Request to the network system to adapt the service requirements based on previous steps:
E.g., to 5G Management plane via Exposure Governance Management Function (EGMF), e.g. for slice modification.
E.g., to 5G Control plane via NEF (e.g. for slice re-selection by AMF/NSSF).
C. Providing the adapted requirements to other involved application servers and clients.

Figure 2:
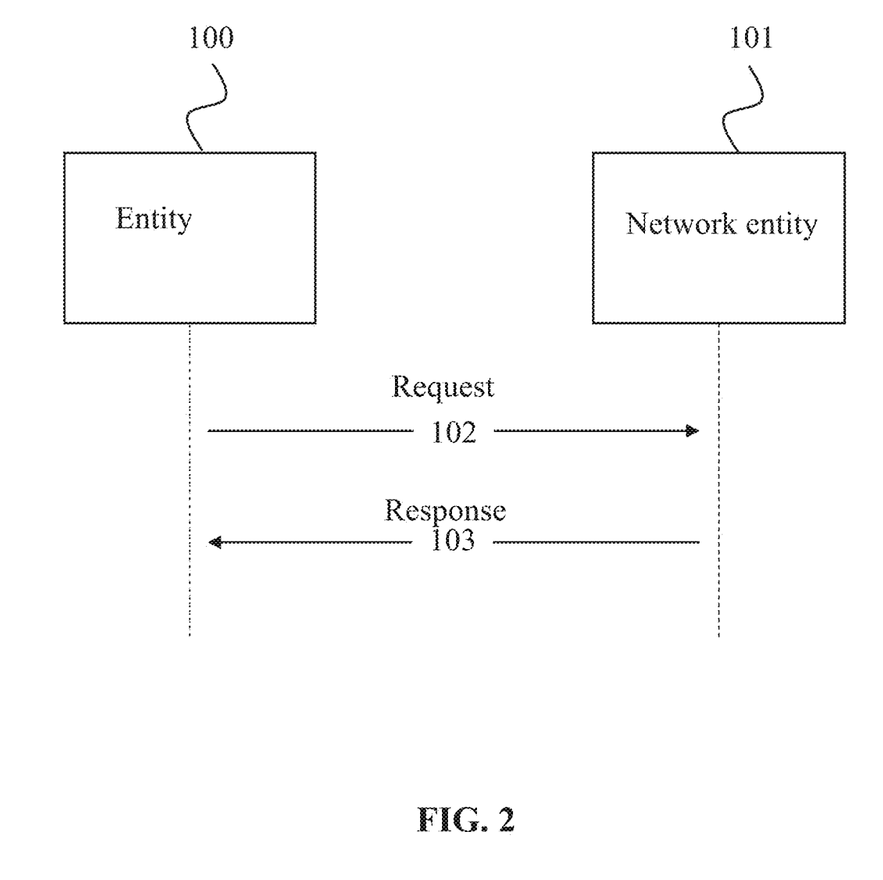
FIG. 2 shows an entity, according to an embodiment of the disclosure, interacting with an application.

FIG. 2 shows the entity 100 of FIG. 1, according to an embodiment of the disclosure. The entity 100 is configured to inter-operate between the network system (specifically the network entity 101 of the network system) and the application 200. The entity 100 may be implemented by an AF, and may be referred to as a "middleware AF" or a "slice enabler AF".

The entity 100 is configured to provide, to the network system, i.e. to the network entity 101, a request 102 for selection and/or adjustment of a NSI providing one or more services to the at least one application 200. The request 102 for selection may be a request for re-selection of an NSI. The request 102 for adjustment may be a request for re-configuration of the NSI. The request 102 comprises a set of requirements for the at least one application and/or for the one or more services.

The application 200 is a placeholder for one or more services. The relation between one or more applications 200 and one or more services can be N:M. That means, one application 200 may comprise more than one service, and at the same time one service may span over multiple distributed applications 200, which may reside in different application servers/clients. An application server may be a vertical application layer (VAL) server or SEAL server. The application server may specifically be a V2X application server, or VAE application server, or FF application specific server, or FF Application Enabler (FFAE) server.

The set of requirements comprises at least one required configuration or adaption of at least one NSI related parameter. For instance, the set of requirements may comprise: a required configuration or adaption of the mapping of one or more NSIs; and/or a required configuration or adaption of one or more NSI parameters; and/or a required configuration or adaption of one or more NSI subnet parameters for one or more UEs; and/or a required configuration or adaption of the one or more network slice types.

The entity 100 is further configured to receive, from the network system, i.e. from the network entity 101, a response 103 to the request 102. The response 103 indicates a decision of the network system regarding the selection and/or adjustment of the NSI. For instance, the response 103 may comprise: a recommended NSI that satisfies the set of requirements; or a recommended adaption of the set of requirements; or an indication that the set of requirements cannot be satisfied.

Accordingly, the network entity 101 (of the network system) is configured to receive the request 102 and to provide the response 103. In particular, the network entity 101 may determine, based on the request 102 and what is included in the request 102, whether one or more NSIs meet the set of requirements. The network entity 101 may then accordingly inform the entity 100 of a recommended NSI that satisfies the set of requirements, or of a recommended adaption of the set of requirements, or that that the set of requirements cannot be satisfied.

The entities 100 and 101 each may comprise processing circuitry (not shown) configured to perform, conduct or initiate the various operations of the respective entity 100 or 101 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors.

In one embodiment, the processing circuitry comprises one or more processors and a non-transitory memory connected to the one or more processors. The non-transitory memory may carry executable program code which, when executed by the one or more processors, causes the respective entity 100 or 101 to perform, conduct or initiate the operations or methods described herein.

In particular, the network entity 101 and the entity 100 may perform methods according to embodiments of the disclosure. In particular, the entity 100 may perform—as shown in FIG. 2—a method for inter-operation between the network system 101 and at least one application 200, as described in the summary part.

Following the above, the entity 100 may accordingly have one or both of the following functionalities: application triggered and network system controlled NSI (re-) selection and application triggered and network system controlled NSI adjustment.

Steps of the application triggered and network system (here exemplarily a 5GS) controlled NSI (re-)selection may be as follows:

Step 1.1: The entity 100 (e.g., a slice enabling/enabler AF) requests 102 to the 5GS, e.g., an AMF or NSSF or Policy Control Function (PCF) via a Network Exposure Function (NEF) as network entity 101 a (re-)mapping of NSI and/or NSI parameters for one or a group of terminals (e.g., UEs). For instance, it sends the request 102 based on a monitored network slice or NSI status. Additionally or alternatively, it sends the request 101 based on a monitored application situation or status. To this end, the entity 100 may obtain NSI status information from the 5GS and/or may obtain application information related to the application 200.

Step 1.2: The 5GS receives the request 102.

Step 1.3: The 5GS adjusts the mapping of the NSI and/or NSI parameters for one or more terminals.

Step 1.4: The 5GS sends back a notification based on the adjustment with necessary parameters to the entity 100.

Step 1.5: The entity 100 provides a notification 201 (see FIG. 3) of the adjustment to other applications.

The NSI (re-)selection request 102 may be as follows:

The request message may be generated by the entity 100, and it may be used to indicate one or more requirements (i.e., the set of requirements).

Such requirements, in the set of requirements, could include:

A configuration and/or adaption of a slice mapping for one or more UEs (or for one or more groups of UEs). Notably, this may have an impact in SA2, since it may come with new signaling to pass from the entity 100 to AMF or NSSF or PCF via NEF.

A configuration and/or adaption of slice and/or slice subnet related policies/parameters. For instance, the entity 100 may be influencing traffic steering, QoS/resource policies as specified in SA2, but with the slicing aspect.

The NSI (re-)selecting response 103 may be as follows:

The response message may be generated by a network entity 101 of the network system, and it may be used to indicate the network's decision in terms of NSI selecting/configuration, for instance, for one or more UEs:

SUCCESS:
(1) Adjust the network system (e.g., one or more NSIs) according to the application's requirement(s).
(2) Recommend registration on one or more other NSIs that can satisfy requirement(s) for the at least one application.

FAILURE:
The application's requirement cannot be satisfied.

Steps of the application triggered and network system (here exemplarily 5GS) controlled NSI adjustment may be as follows:

Step 2.1: The entity 100 sends a request 102, e.g. comprising a set of customized properties of the NSIs that are essential for certain use cases, to the 5GS.

Step 2.2: The 5GS receives the request 102.

Step 2.3: The 5GS adjusts in terms of network service provisioning for one or more terminals (e.g., UEs).

Step 2.4: The 5GS sends back a response 103, e.g. with necessary parameters to the entity 100.

Step 2.5: The entity 100 may provide a notification 201 (see FIG. 3) of the adjustment to at least one application.

The NSI adjustment request 102 may be as follows:

The request message may be generated by the entity 100, and it may be used to indicate one or more requirements (i.e., the set of requirements).

Such requirements, in the set of requirements, could include at least one of the following:

Slice and/or performance related requirements (e.g., based on TS28.530):
Slice type,
Charging requirement,
Coverage area requirement,
End-to-end latency requirement,
Overall user density requirement,
Service availability requirement,
Service reliability requirement,
Priority requirement,
Degree of isolation requirement,
Area traffic capacity requirement,
Mobility requirement,
UE speed requirement.

The NSI adjustment response 103 may be as follows:

The response message may be generated by a network entity 101 of the 5GS, and it may be used to indicate the network system's decision in terms of NSI adjustment:

SUCCESS:
(1) Adjust the network system (e.g., one or more NSIs) according to the application's requirement(s).
(2) Recommend a registration on one or more other NSIs that can satisfy the requirement(s) for the at least one application.

FAILURE:
The application's requirement cannot be satisfied.

NEGOTIATION:
Recommend an adaptation of the application's requirements.

FIG. 3 shows the entity 100 of FIG. 1 or FIG. 2, according to an embodiment of the disclosure, and shows an interaction of the entity 100 with the application 200. In particular, FIG. 3 shows a notification 201 provided by the entity 100 to the application 200. The same procedure may notably be used by the entity 100 to likewise notify other entities than the application 200.

This procedure enables, in particular, the notification 201 of the configuration/adaptation of the NSI or slice requirements to one or more other vertical/applications/application servers (e.g., VAL, VAE, SEAL servers etc.). This is beneficial to allow for further service adaptation based on the adapted network slice, NSI, or NSI parameters.

The notification 201 message from the entity 100 to the application 200 (e.g., one of the VAL/SEAL/VAE/FFAE server) may include at least one of the following:

| Information element | Description |
|---|---|
| VAL UE ID | Identity of the VAL UE, for which a slice adaptation requirement is initiated. |
| VAL group ID | Identity of the VAL group, for which the slice adaptation requirement is initiated. |
| VAL service ID | The service ID, to which the slice adaptation requirement corresponds. |
| slice application requirement | The requirement for the slice parameter change, e.g., slice mapping for an application service. |
| Time validity | The time, for which this will apply |
| Geographical area | The area of the slice coverage (in case of temporary support). |

A result message 202 from the application 200 (e.g., from the VAL/SEAL/VAE/FFAE server) to the entity 100 may include at least one of the following:

| Information element | Description |
|---|---|
| Result | The result of the slice requirements adaptation corresponding to the application requirement. |

In the following, specific implementation embodiments for the above-described entity 100 and network system (i.e., network entity 101) will be described. First a V2X use case is described with respect to FIG. 4 and FIG. 5, respectively.

For some use cases, e.g. V2X, there could be many reasons for requiring dynamic slicing. Some are highlighted below:

Change of level of automation (LoA) of one vehicle: different application QoS for one vehicle or a group of vehicles. Thus, different network QoS/resources may be required for different applications. Each application may be related to one or more ongoing service(s), each service consisting of one or multiple PDU session(s).

Change of vehicle group formation: for Uu-based V2X communications (one or more members leave or enter the platoon, inter-vehicle distance changes). This leads to different V2X service area coverage. Thus, there may be different application QoS requirements (e.g., communication range). Thus, there may be different network requirements for different applications. Each application may be related to one or more ongoing service(s), each service consisting of one or multiple PDU session(s).

Adaptation of other factors perceived by the application (e.g. speed/mobility, accidents, road conditions change due to weather, etc.). This may lead to a change of application requirements, and thus to different network requirements for the ongoing service(s), each consisting of one or multiple PDU session(s).

Figure 5:
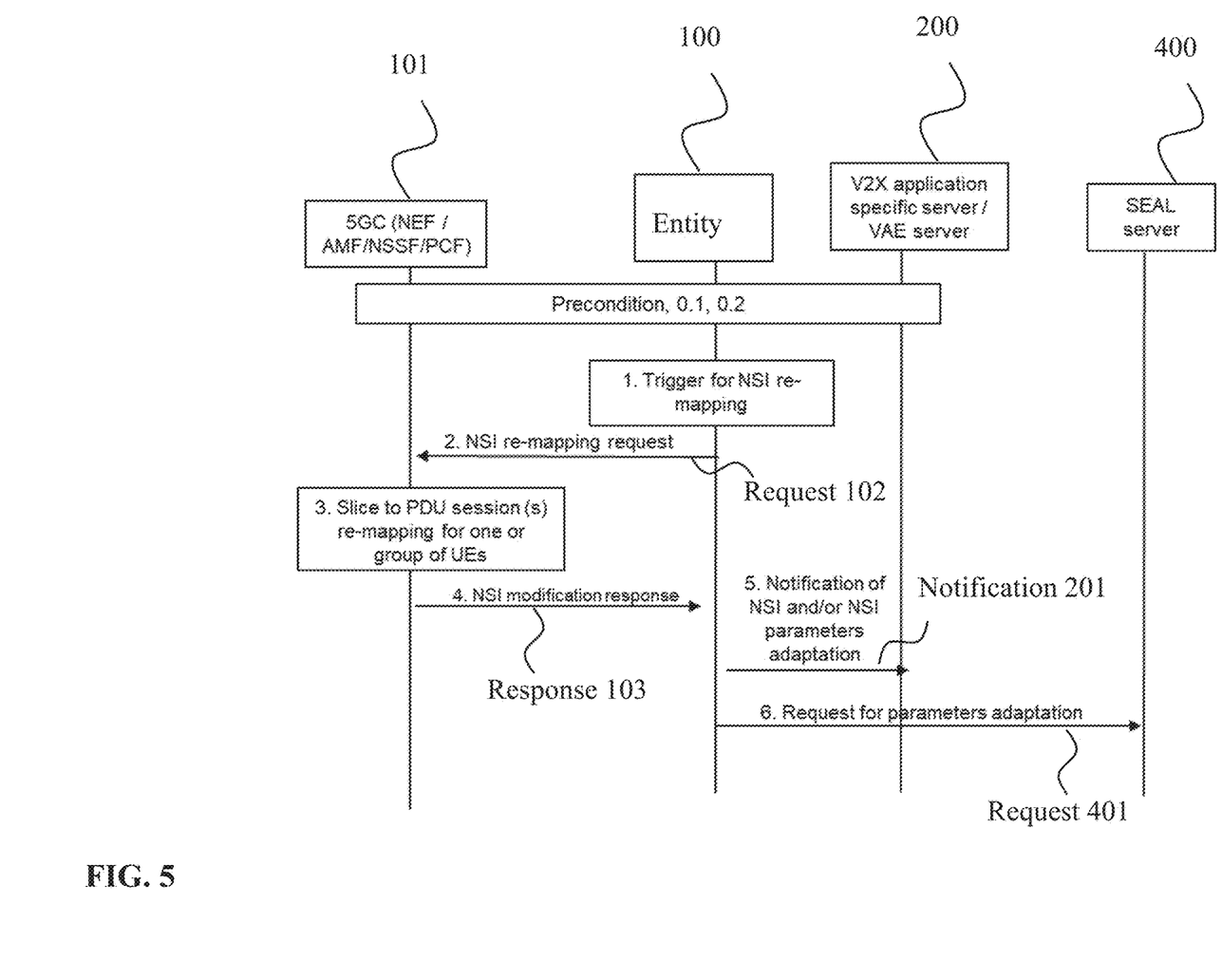
FIG. 5 shows a NSI re-selection procedure for the V2X use case, performed by entities according to embodiments of the disclosure.

Pre-conditions: As indicated in FIG. 5, the V2X/VAE application (server) 200 has the mapping relationship of the V2X service requirements (e.g. based on LoA) and NSI information corresponding to the V2X services, and the application server 200 has provided this mapping relationship information to the VAE client.

Precondition 0.1: The entity 100 subscribes to the V2X application servers 200 to receive service information, like a list of single network slice selection assistance information (S-NSSAI), slice service types (SSTs), slice profiles. etc.

Precondition 0.2: The entity 100 subscribes and receives periodically network and/or QoS monitoring, e.g., as specified in TS23.501. This may include network slice analytics and performance monitoring information (e.g. slice congestion, load) which can be exposed by NWDAF via NEF, as e.g. specified in TS 23.288.

Figure 4:
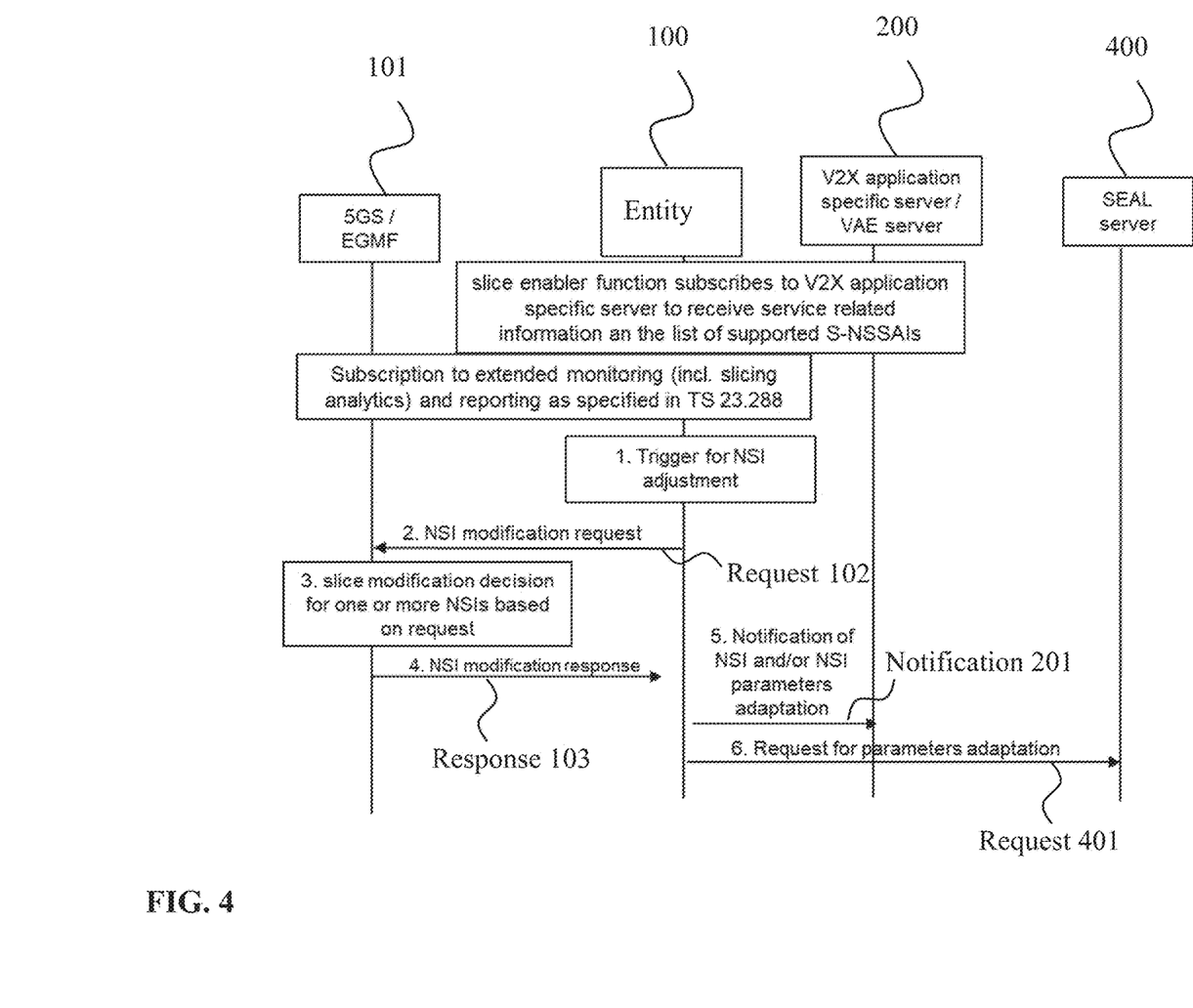
FIG. 4 shows a NSI modification procedure for a V2X use case, performed by entities according to embodiments of the disclosure.

FIG. 4 shows a NSI modification procedure in the V2X use case.

Step 1. This may trigger some NSI parameter (e.g. bandwidth, latency) adaptation by the entity 100.

Step 2. The entity 100 will then request 102 a modification of the slice parameters (or change of the network slice for the application) to the 3GPP Management System via EGMF (network entity 101).

Step 3. The 3GPP Management System is modifying the NSI and/or NSI parameters as requested.

Step 4. A modification response 103, which includes the result (e.g., Yes, No, Negotiation)

Step 5. After the NSI modification, the notification 201 is sent to the V2X application specific server 200, to update the mapping and configuration. A notification may be also sent to the VAE Client at the V2X-UE about the adaptation of the NSI parameters or the NSI re-selection (based on the type of modification)

Step 6. The entity 100 may also inform 401 the SEAL Servers 400 (as e.g. specified in TS23.434) to request the adaptation of configuration, resources, QoS, etc.

FIG. 5 shows a NSI re-selection procedure in the V2X use case.

Step 1. Based on slice monitoring and subscription to SEAL servers 400, as in above steps, the entity 100 may trigger NSI re-selection for one or more UEs.

Step 2. The entity 100 will then request 102 a NSI re-mapping (or change of the network slice for one or more applications) to NEF, e.g. via Naf, N33 signaling.

Step 3. The 5GC control plane, e.g. AMF/NSSF/PCF (as network entity 101) will handle this request 102 from the entity 100, to adapt the slice to PDU session mapping for one or more UEs (for which the request applies).

Step 4. A response 103, which includes the result (e.g., Yes, No, Negotiation) is sent back to the entity 100.

Step 5. After the NSI re-mapping, the notification 201 is sent to the V2X application specific server 21313, to update the mapping and configuration. A notification may be also sent to the VAE Client at the V2X-UE about the adaptation of the NSI re-selection.

Step 6. The entity 100 may also inform 401 the SEAL Servers 400 (as specified in TS23.434) to request the adaptation of configuration, resources, QoS, etc.

Figure 6:
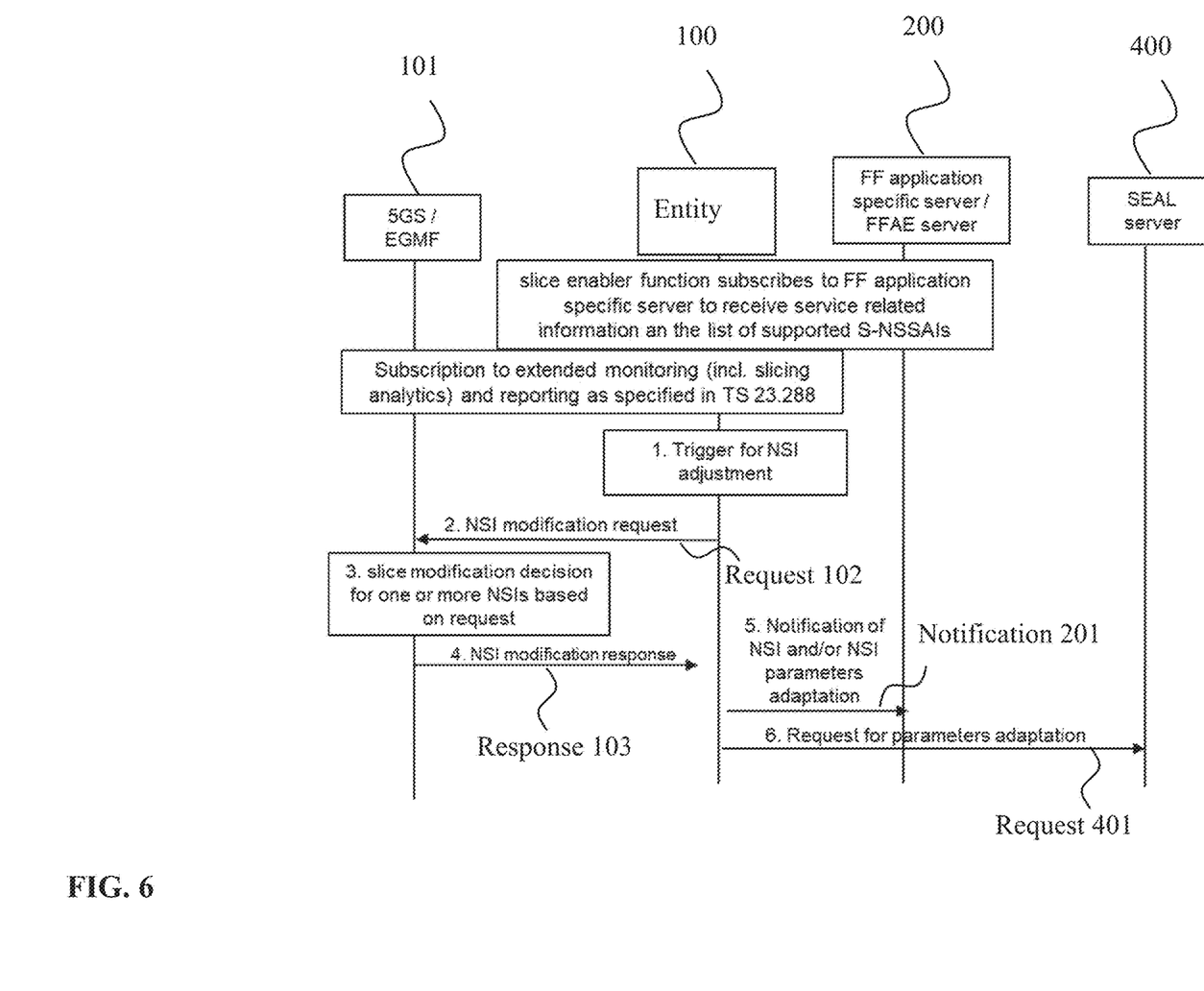
FIG. 6 shows NSI modification procedure for a FF use case, performed by entities according to embodiments of the disclosure.
Figure 7:
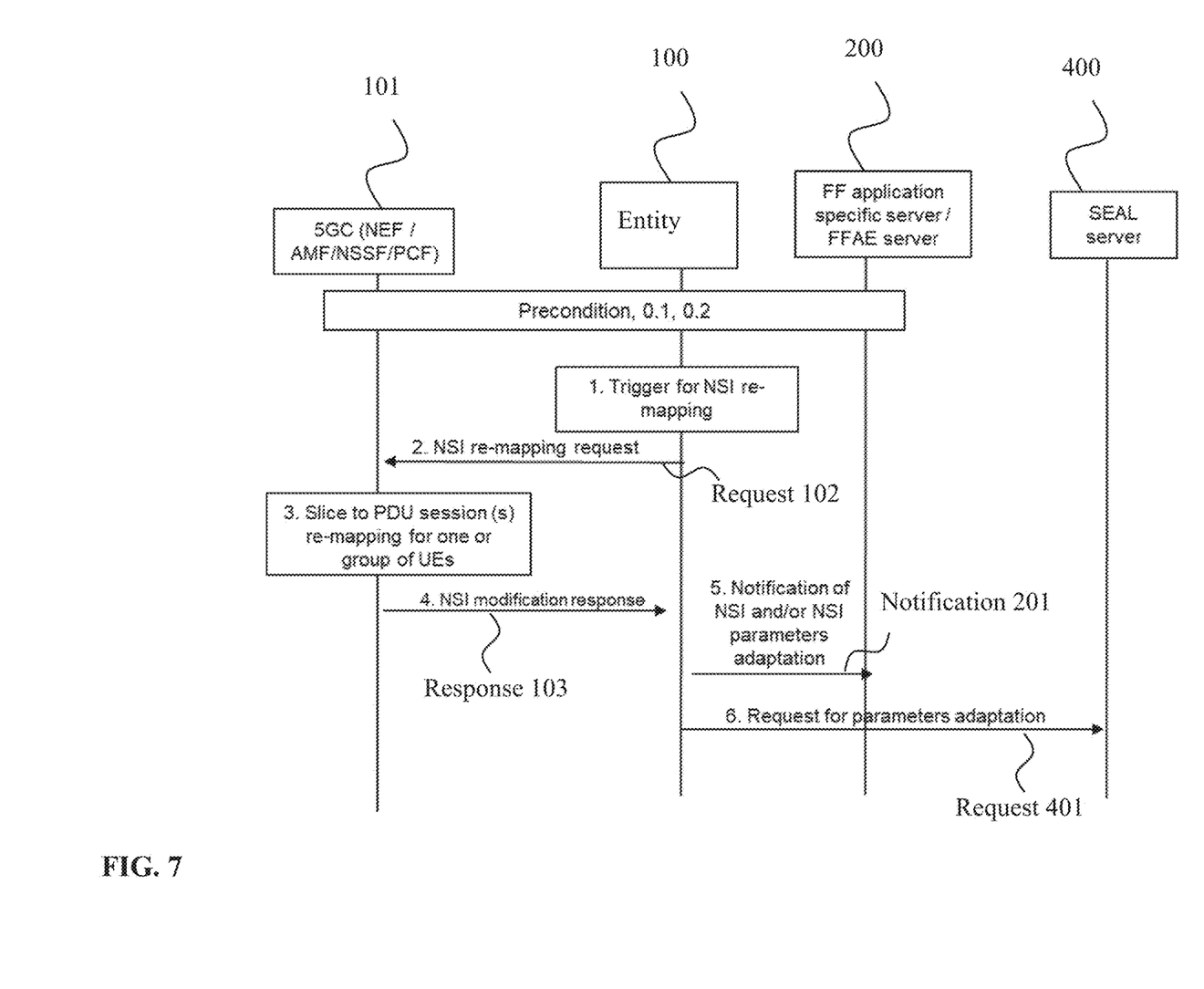
FIG. 7 shows a NSI re-selection procedure for the FF user case, performed by entities according to embodiments of the disclosure.

Next, a FF use case is described with respect to FIG. 6 and FIG. 7. The adaptation of the slice parameters may be essential due to the dynamicity in some scenarios (e.g. due to mobility, density, interference in outdoor use cases). The entity 100 may provide the translation of application requirements to the network slice requirements, or vice versa, for dynamic interaction between the Automated Guided Vehicle (AGV) controllers/AGVs and the underlying network.

Pre-condition: The application (FFAE server) 200 has the mapping relationship of FF service requirements (e.g. based on LoA) and NSI information corresponding to the FF services, and the FFAE server has provided this mapping relationship information to the FFAE client(s).

Precondition 0.1: The entity 100 subscribes to FF application servers 200 to receive service related info, as the list of S-NSSAIs, SSTs, slice profiles etc.

Precondition 0.2: The entity 100 subscribes and receives periodically network and QoS monitoring as specified in TS23.501. This may include network slice analytics and performance monitoring information (e.g. slice congestion, load), which can be exposed by NWDAF via NEF, e.g. as specified in TS 23.288.

FIG. 6 shows a NSI modification procedure in the FF use case

Step 1. This may trigger some NSI parameter (e.g. bandwidth, latency) adaptation by the entity 100

Step 2. The entity 100 will then request 102 a modification of the slice parameters (or change of the network slice for the application) to 3GPP Management System via EGMF (as the network entity 101).

Step 3. The 3GPP Management System is modifying the NSI and/or NSI parameters as requested.

Step 4. A modification response 103, which includes the result (e.g., Yes, No, Negotiation) is sent.

Step 5. After the NSI modification, the notification 201 is sent to the FF application specific server 200, to update the mapping and configuration. A notification may be also sent to the FFAE Client at the FF-UE about the adaptation of the NSI parameters or the NSI re-selection (based on the type of modification).

Step 6. The entity may also inform 401 the SEAL Servers 400 (as specified in TS23.434) to request the adaptation of configuration, resources, QoS, etc.

FIG. 7 shows a NSI re-selection procedure in the FF use case.

Step 1. Based on slice monitoring and subscription to SEAL servers 400, as in the above steps, the entity 100 may trigger NSI re-selection for one or more UEs.

Step 2. The entity 100 will then request 102 a NSI re-mapping (or change of the network slice for one or more applications 200) to NEF, e.g., via Naf, N33 signalling.

Step 3. The 5GC control plane, e.g. AMF/NSSF/PCF will handle this request 102 from the entity 100, to adapt the slice to PDU session mapping for one or more UEs (for which the request 102 applies).

Step 4. A response 103, which includes the result (e.g., Yes, No, Negotiation) is sent back to the entity 100.

Step 5. After the NSI re-mapping, the notification 201 is sent to the FF application specific server 200, to update the mapping and configuration. A notification may be also sent to the FFAE Client at the FF-UE about the adaptation of the NSI re-selection Step 6. Slice enabler function needs to also inform the SEAL Servers (as specified in TS23.434) to request the adaptation of configuration, resources, QoS, etc.

The present embodiments of the disclosure have been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An entity for inter-operation between a network system and at least one application, the entity being configured to:
provide, to the network system, a request for at least one of selection and adjustment of a network slice instance (NSI) for providing one or more services to the at least one application,
wherein the request comprises a set of requirements for the at least one application and the one or more services, the set of requirements comprising a required configuration or adaption of at least one NSI related parameter;
receive, from the network system, a response to the request, wherein the response indicates a decision of the network system regarding at least one of the selection and adjustment of the NSI; and
receive:
a set of quality of experience (QoE) parameters for the at least one application and the one or more services, and
from a network data analytics function (NWDAF), quality of service (QoS) status information for at least one of the one or more application and the one or more services.

2. The entity according to claim 1, wherein the response to the request comprises one of:
a recommended NSI that satisfies the set of requirements;
a recommended adaption of the set of requirements; and
an indication that the set of requirements cannot be satisfied.

3. The entity according to claim 1 further configured to:
provide, to the at least one application, a notification regarding at least one of the selection and adjustment of the NSI, according to the response received from the network system.

4. The entity according to claim 1, wherein
the required configuration or adaption of the at least one NSI related parameter included in the set of requirements comprises at least one of:
a required configuration or adaption of the mapping of the one or more NSIs;
a required configuration or adaption of the one or more NSI parameters;
a required configuration or adaption of one or more NSI subnet parameters for one or more User Equipments (UEs); and
a required configuration or adaption of the one or more network slice types.

5. The entity according to claim 1, wherein
the request comprises a request for selection of at least one NSI.

6. The entity according to claim 4, wherein
the one or more NSI parameters comprise at least one of:
a slice type;
a charging requirement;
a coverage area requirement;
end-to-end latency requirement;
an overall user density requirement;
a service availability requirement;
a service reliability requirement;
a priority requirement;
a degree of isolation requirement;
an area traffic capacity requirement;
a mobility requirement;

a UE speed requirement;
a delay tolerance;
a deterministic communication;
download (DL) and/or upload (UL) throughput per UE;
at least one of a DL and UL throughput per network slice;
a maximum packet size;
a maximum number of connections;
Key performance indicator (KPI) monitoring;
one or more supported access technologies;
user management open;
one or more Vehicle-to-Anything (V2X) models;
term density;
an activity factor;
Jitter;
Survival time; and
Reliability.

7. The entity according to claim 1, further configured to:
obtain at least one of:
NSI status information from the network system, and
application information related to the at least one application; and
provide the request for at least one of selection and adjustment of a NSI based on at least one of the NSI status information and the application information.

8. A network entity, configured to:
receive, from a first entity, a request for at least one of selection and adjustment of a network slice instance (NSI) for providing one or more services to at least one application,
wherein the request comprises a set of requirements of the at least one application and the one or more services, the set of requirements comprising a required configuration or adaption of at least one NSI related parameter;
provide, to the first entity, a response to the request, the response comprising one of:
a recommended NSI that satisfies the set of requirements;
a recommended adaption of the set of requirements;
an indication that the set of requirements cannot be satisfied; and
provide:
a set of quality of experience (QoE) parameters for the at least one application and the one or more services, and
from a network data analytics function (NWDAF), quality of service (QoS) status information for at least one of the one or more application and the one or more services.

9. The network entity according to claim 8, further configured to:
adjust one or more NSIs based on the request, if a NSI can satisfy the set of requirements.

10. A method for inter-operation between a network system and at least one application, the method comprising:
providing, to the network system, a request for at least one of selection and adjustment of a network slice instance (NSI) for providing one or more services to the at least one application,
wherein the request comprises a set of requirements for the at least one application and the one or more services, the set of requirements comprising a required configuration or adaption of at least one NSI related parameter;
receiving, from the network system, a response to the request, wherein the response indicates a decision of the network system regarding at least one of the selection and adjustment of the NSI; and
receiving:
a set of quality of experience (QoE) parameters for the at least one application and the one or more services, and
from a network data analytics function (NWDAF), quality of service (QOS) status information for at least one of the one or more application and the one or more services.

11. The network entity according to claim 8, wherein the required configuration or adaption of the at least one NSI related parameter included in the set of requirements comprises at least one of:
a required configuration or adaption of the mapping of the one or more NSIs;
a required configuration or adaption of the one or more NSI parameters;
a required configuration or adaption of one or more NSI subnet parameters for one or more User Equipments (UEs); and
a required configuration or adaption of the one or more network slice types.

12. The network entity according to claim 8, wherein the request comprises a request for selection of at least one NSI.

13. The network entity according to claim 11, wherein the one or more NSI parameters comprise at least one of:
a slice type;
a charging requirement;
a coverage area requirement;
end-to-end latency requirement;
an overall user density requirement;
a service availability requirement;
a service reliability requirement;
a priority requirement;
a degree of isolation requirement;
an area traffic capacity requirement;
a mobility requirement;
a UE speed requirement;
a delay tolerance;
a deterministic communication;
download (DL) and/or upload (UL) throughput per UE;
at least one of a DL and UL throughput per network slice;
a maximum packet size;
a maximum number of connections;
Key performance indicator (KPI) monitoring;
one or more supported access technologies;
user management open;
one or more Vehicle-to-Anything (V2X) models;
term density;
an activity factor;
Jitter;
Survival time; and
Reliability.

14. The method according to claim 10, wherein the response to the request comprises one of:
a recommended NSI that satisfies the set of requirements;
a recommended adaption of the set of requirements; and
an indication that the set of requirements cannot be satisfied.

15. The method according to claim 10, further comprising:
providing, to the at least one application, a notification regarding at least one of the selection and adjustment of the NSI, according to the response received from the network system.

16. The method according to claim 10, wherein the required configuration or adaption of the at least one NSI related parameter included in the set of requirements comprises at least one of:
- a required configuration or adaption of the mapping of the one or more NSIs;
- a required configuration or adaption of the one or more NSI parameters;
- a required configuration or adaption of one or more NSI subnet parameters for one or more User Equipments (UEs); and
- a required configuration or adaption of the one or more network slice types.

17. The method according to claim 10, wherein the request comprises a request for selection of at least one NSI.

18. The method according to claim 16, wherein the one or more NSI parameters comprise at least one of:
- a slice type;
- a charging requirement;
- a coverage area requirement;
- end-to-end latency requirement;
- an overall user density requirement;
- a service availability requirement;
- a service reliability requirement;
- a priority requirement;
- a degree of isolation requirement;
- an area traffic capacity requirement;
- a mobility requirement;
- a UE speed requirement;
- a delay tolerance;
- a deterministic communication;
- download (DL) and/or upload (UL) throughput per UE;
- at least one of a DL and UL throughput per network slice;
- a maximum packet size;
- a maximum number of connections;
- Key performance indicator (KPI) monitoring;
- one or more supported access technologies;
- user management open;
- one or more Vehicle-to-Anything (V2X) models;
- term density;
- an activity factor;
- Jitter;
- Survival time; and
- Reliability.

19. The method according to claim 10, further comprising:
- obtaining at least one of:
  - NSI status information from the network system, and
  - application information related to the at least one application; and
- providing the request for at least one of selection and adjustment of a NSI based on at least one of the NSI status information and the application information.

* * * * *